United States Patent [19]

Brussels

[11] 4,119,086
[45] Oct. 10, 1978

[54] STORAGE TANK ASSEMBLY
[75] Inventor: Nathan E. Brussels, Cherry Hill, N.J.
[73] Assignee: Solar Energy Systems, Inc., Burlington, N.J.
[21] Appl. No.: 813,636
[22] Filed: Jul. 7, 1977
[51] Int. Cl.² .............................................. F24J 3/02
[52] U.S. Cl. .................................. 126/271; 126/400; 237/1 A; 165/104 S; 137/574
[58] Field of Search ............... 126/271, 400; 237/1 A; 165/104 S; 137/574, 584

[56] References Cited
U.S. PATENT DOCUMENTS

| 2,980,131 | 4/1961 | Williams | 137/574 |
| 3,983,929 | 10/1976 | Thomason et al. | 165/104 S |
| 4,010,731 | 3/1977 | Harrison | 165/104 S |

Primary Examiner—Carroll B. Dority, Jr.
Attorney, Agent, or Firm—Lerner, David, Littenberg & Samuel

[57] ABSTRACT

A storage tank divided into three liquid-tight compartments. The end compartments are liquid storage compartments and are separated by a central non-liquid holding or "dry" compartment fitted with controls, pumps and instrumentation. The end compartments are selectively coupled by liquid carrying conduits arranged external to the outer shell of the tank. Although the assembly is adapted to be buried underground, easy access to the contents of the intermediate compartment is provided by means of a periscope-like manhole opening. The first and second end compartments respectively store solar heated fluid at a higher temperature and fluid at a lower "use" temperature. The solar heated fluid in the first compartment is transferred to the second compartment for use in a heating system. Auxiliary heating means may be used to elevate the temperature level in the second compartment for example, during "off-peak" demand periods.

The system is designed to provide open "drain back" or closed (anti-freeze) systems with additional solar cycle heat exchanger.

9 Claims, 2 Drawing Figures

STORAGE TANK ASSEMBLY

BACKGROUND OF THE INVENTION

Apparatus for storing heat energy are advantageously employed in cooling and/or heating systems. However, conventional apparatus lacks the capability of controlling fluid levels and temperature levels to meet the demands of the particular application.

BRIEF DESCRIPTION OF THE INVENTION

The present invention is characterized by comprising a unitary tank structure capable of meeting the above requirements, with a system design which lends itself to ease of assembly, installation, maintenance and repair, and which provides a capability of storing heat energy at the maximum level capable of being achieved by the solar collectors coupled to the first compartment and transferring the hotter liquid when necessary to return the temperature level of the liquid of the "use" tank to the desired "use" level.

The unitary tank is divided into three fluid-tight compartments defined by a pair of spaced partitioning walls welded to the interior surface of the tank.

The partitions keep the central compartment "dry" (i.e. free of fluid) in order to effectively serve as the equipment housing compartment. Heated fluid is pumped into the solar fluid compartment from the solar energy collector.

A heater exchanger is utilized to transfer heat to a utilization means.

Transfer pumps are provided to assure equalization of liquid contents in the end compartments. The supplemental fluid compartment may be provided with means to equalize temperature levels and/or raise temperature levels by operation during "off-peak" demand periods in regions offering off-peak power at lower rates. The apparatus permits storage of solar heated liquid at the highest temperature level the solar collectors are capable of achieving while the remaining liquid compartment serves as a source of withdrawing liquid at a desired "use" temperature, whereby the controls permit liquid transfer to both replenish the liquid and to permit maintenance of the desired use temperature level.

OBJECT AND BRIEF DESCRIPTION OF THE FIGURES

It is therefore a primary object to provide a novel unitary storage tank capable of storing fluid derived from independent sources in separate liquid-tight compartments, whereby controls and fluid moving equipment, which are housed in an intermediate compartment, are utilized to maintain the temperature and liquid level in the end "use" compartment at the desired level.

Another object of the present invention is to provide apparatus of the type described hereinabove and which is capable of providing simple access to the intermediate compartment to facilitate maintenance and repair.

The above, as well as other objects, will become apparent when reading the accompanying description and drawings in which.

DETAILED DESCRIPTION OF THE INVENTION

Figure 1:
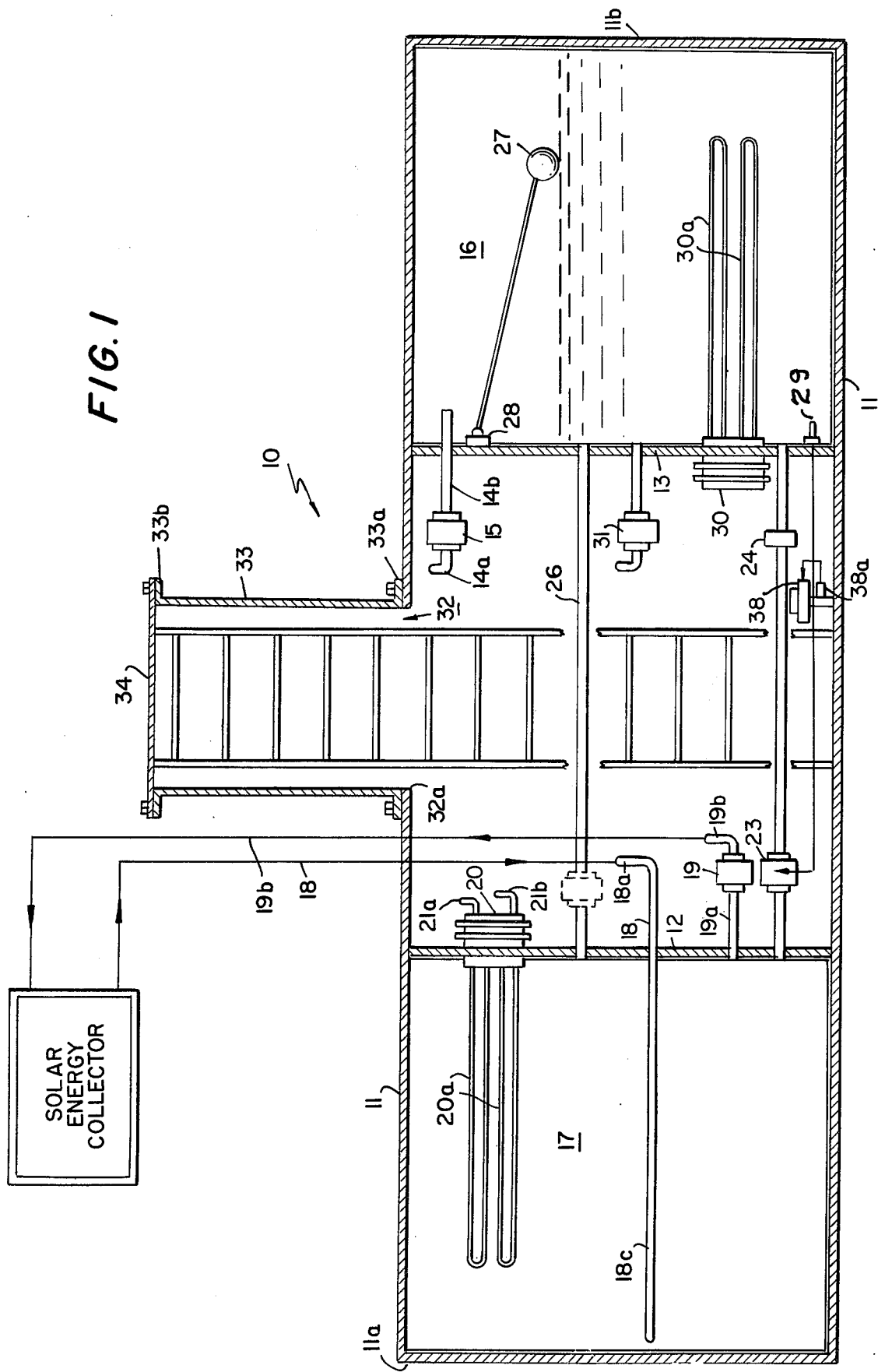
FIG. 1 shows a sectionalized elevational view of storage apparatus designed in accordance with the principles of the present invention.
Figure 2:
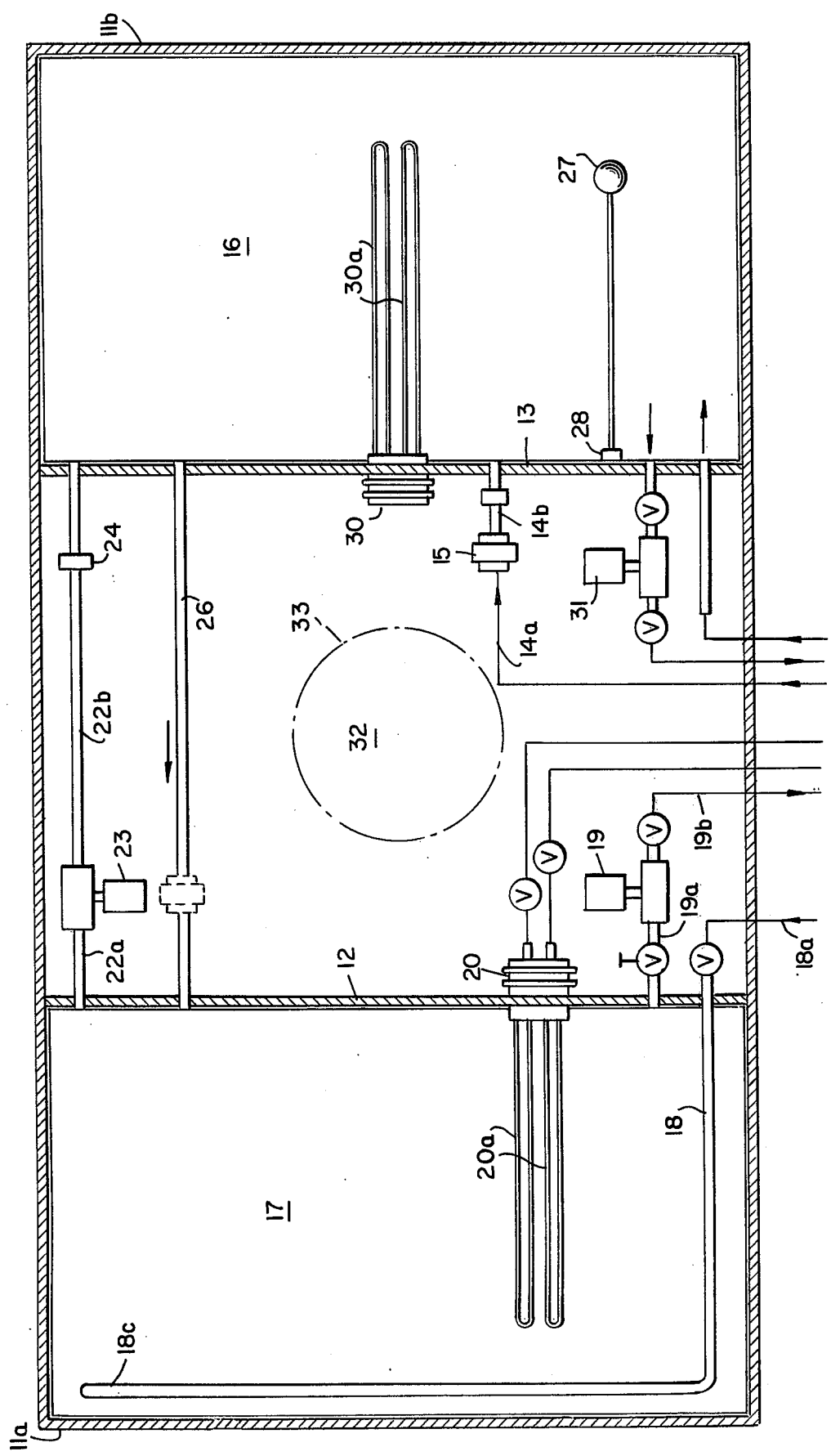
FIG. 2 is a schematic view showing the equipment and controls housed within the central compartment.

FIGS. 1 and 2 show apparatus 10 embodying the principles of the present invention and comprising a steel tank 11, generally of a cylindrical shape and closed by substantially flat end walls 11a and 11b. The interior is divided into three compartments by means of steel plates 12 and 13 which serve as bulkheads and are welded to the interior surface of tank 11 to form watertight seals on the side of each plate. The right-hand compartment 16 is replenished with water from an external source (not shown) by means of a conduit 14a which enters through the wall of the center compartment and into water pump 15 which pumps the water into compartment 16 through conduit 14b and an opening in bulkhead 13. Pump 15 may be replaced by a solenoid-operated valve.

The left-hand compartment 17 receives heated fluid through conduit 18 which is coupled to a solar energy collector apparatus through its return conduit (not shown) to feed heated fluid into the left-hand end of compartment 17. The fluid is recirculated, after suitable mixing in compartment 17, to the solar collector apparatus by means of an opening in bulkhead 12, conduit 19a, pump 19 and conduit 19b which extends through an opening in the tank wall to the solar energy collector supply conduit.

The solar energy collector apparatus may be of any conventional design and the particular apparatus lends no novelty to the present invention. The unit selected may therefore be chosen to accommodate the application to best advantage. For example, collectors as described in U.S. application Ser. No. 815,499 filed July 14, 1977 and Ser. No. 810,015 filed June 27, 1977 assigned to the assignee of the present application, may be employed with the apparatus of the present invention.

The solar collectors referred to hereinabove capture heat from solar radiation and transfer the heat to the fluid flowing therethrough and derived from the supply conduit 19b. It should be understood that a conduit run of a length sufficient to couple the solar collector supply header, usually mounted well above ground level, to the conduit 19b is provided. A similar return conduit is also required. By extending the conduit 18c to the left-hand end of compartment 17, a better and more uniform mixture of the liquid is obtained.

If desired, a heat exchanger unit 20 may be provided to service a domestic hot water system.

The unit is mounted upon bulkhead 12 and its coils 20a extend through an opening in the bulkhead and into the liquid in compartment 17. Heat energy is withdrawn and pumped through conduit 21a into the coils of a hot water tank (not shown) positioned at a remote location. The return from the coils is coupled to return conduit 21b and back to the heat exchanger coils 20a.

The compartment 17 is available to store the liquid heated by the solar collector at the highest temperature level at which the solar collector is capable of achieving. Depending upon the size, type and number of solar collectors, the solar collectors may heat the liquid to a level in the range from 100°-200° F., for example.

Since the temperatures required for heating applications is typically in the range from 60°-200° F., compartment 16 serves as a storage medium for heating applications (or other applications requiring liquid at temperature levels lower than that of compartment 17).

The transfer takes place by means of conduit 22a, transfer pump 23 and conduit 22b which further includes a flow-preventer 24. When the temperature in compartment 16 drops below a desired level, a temperature sensor 29 activates pump 23 to transfer fluid from compartment 17 through conduit 22a, pump 23 and conduit 22b, into compartment 16. Flow-preventer 24 automatically opens when pump 23 is activated to permit fluid flow into compartment 16. When pump 23 is turned off, the flow-preventer closes and prevents flow in the reverse direction.

The openings in the bulkheads 12 and 13 which communicate with the conduits 22a and 22b are preferably near the bottom of the tank. Conduit 26 serves as a return conduit to accomodate water level equilization and is preferably located just below the desired "full" capacity level of the compartments.

The liquid level in compartment 16 is monitored by float member 27. When the liquid in compartment 16 drops below a desired level, float 27 moves downwardly, tripping switch 28 mounted at bulkhead 13 which then activates pump 15 to replenish the contents of compartment 16. Alternatively, pump 15 may be a valve when fluid can be gravity fed.

Compartment 16 may be filled with an auxiliary heater 30 mounted upon bulkhead 13 and having heater coils extending into compartment 16. The auxiliary heater may be activated to maintain the desired level in compartment 16, preferably during "off-peak" demand periods in those regions which offer a cost reduction for power use during the off-peak demand periods.

The central compartment may also be fitted with a pump 31 for pumping water to a heating coil or to a heat pump.

The pump 31 may also be connected to closed circuit evaporator cooler for cooling the fluid in the closed circuit system.

In systems in which the heat exchanger to be cooled is cooler than the fluid in compartment 16 the pump may be turned off to allow the liquid to drain back into compartment 16 until the temperature level of the coolant rises above the temperature in compartment 16.

The tank is designed for installation at ground level or may be installed below ground. The latter installation takes full advantage of the relatively constant temperature level below the frost line thereby reducing the temperature changes of stored liquid due to seasonal changes. To facilitate access for maintenance and/or repair the central compartment is provided with an opening 32 surrounded by a mounting flange 32a. A cylindrical turret extension 33 has a lower flange 33a mating with flange 32a for securement by suitable fastening means (not shown). An upper flange 33b supports a removable manhole cover 34 bolted or otherwise fastened to flange 33b. Suitable gaskets (not shown) are arranged between the mating flanges to provide water tight joinders. All connections to the end compartments to the central compartment to facilitate inspection and repair. A ladder 35 serves as the means to gain access to the central compartment. The length of turret extension 33 is selected to spring the upper end to approximately surface level. For above-ground installations the shorter turret may be employed or the turret may be omitted by mounting the cover 34 directly upon flange 32a. The tank external surface is covered by an insulation such as urethane to reduce heat loss to the atmosphere. The tank is furnished with a sump pump 38 which includes an automatic switch 38a which is rendered operative in the event there is seepage of ground water into the "dry" compartment, in order to pump the collected seepage out of the compartment.

Many variations and modifications will now become apparent to those skilled in the art. It is preferred therefore that the present invention be limited not by the specific disclosure herein but only by the appended claims.

What is claimed is:

1. Apparatus for storing liquid at different temperature levels comprising unitary hollow tank means;
    first and second bulkheads arranged in spaced apart fashion within the interior of the tank means and being joined to the tank wall to form three water tight compartments including first and second end compartments separated by a central compartment;
    first conduit means extending through said central compartment for coupling said first compartment to an external fluid heating source;
    second conduit means extending through said central compartment for coupling an external heated liquid utilization device to said second compartment;
    third conduit means extending through said central compartment for transferring liquid between said first and second compartments to regulate the temperature levels of the liquids in said end compartments.

2. The apparatus of claim 1 wherein said external liquid heating means comprises solar energy collector means, and external conduit means for coupling said collector means to said first conduit means;
    said first conduit means including pump means for circulating liquid between said first compartment and said collector means.

3. The apparatus of claim 2 wherein said first conduit means includes a conduit extension projecting through the bulkhead common to said first and third compartments and to a position close to the end of the tank remote from the last mentioned bulkhead to facilitate uniform mixing of liquid in said first compartment.

4. The apparatus of claim 3 wherein said first conduit means comprises supply and return conduits coupled between the tank wall and the first compartment, said supply conduit being coupled to said conduit extension;
    said return conduit terminating at said common bulkhead.

5. The apparatus of claim 1 wherein said third conduit means includes pump means for pumping fluid between said end compartments and through said third conduit means.

6. The apparatus of claim 1 wherein said conduit means further comprises pump means for pumping liquid in said second compartment to the liquid utilization source.

7. The apparatus of claim 1 further comprising liquid level detection means mounted in said second compartment;
    fourth conduit means extending through said cenral compartment for coupling said second compartment to an external liquid source;
    valve means operated by said level detection means to open when the liquid level falls to permit liquid from the external source to enter said third compartment.

8. The apparatus of claim 5 wherein said third conduit means comprises separate supply and return conduits extending between openings in said bulkheads which are located near the bottom of the tank;

said return conduit extending between openings in said bulkheads which are located at the level representing full liquid capacity;

and said pump means being connected in said supply conduit.

9. The apparatus of claim 1 further including an opening in said tank wall communicating with said central compartment;

a hollow turret extension having its lower end joined to said opening and a removable cover being joined to its upper end to gain access to the central compartment from ground level while said tank is mounted below ground level.

* * * * *